April 6, 1948.   A. M. TARBOX   2,439,350
AUTOMATIC ADJUSTMENT FOR ELEVATOR BRAKES
Filed Oct. 9, 1943   2 Sheets-Sheet 2
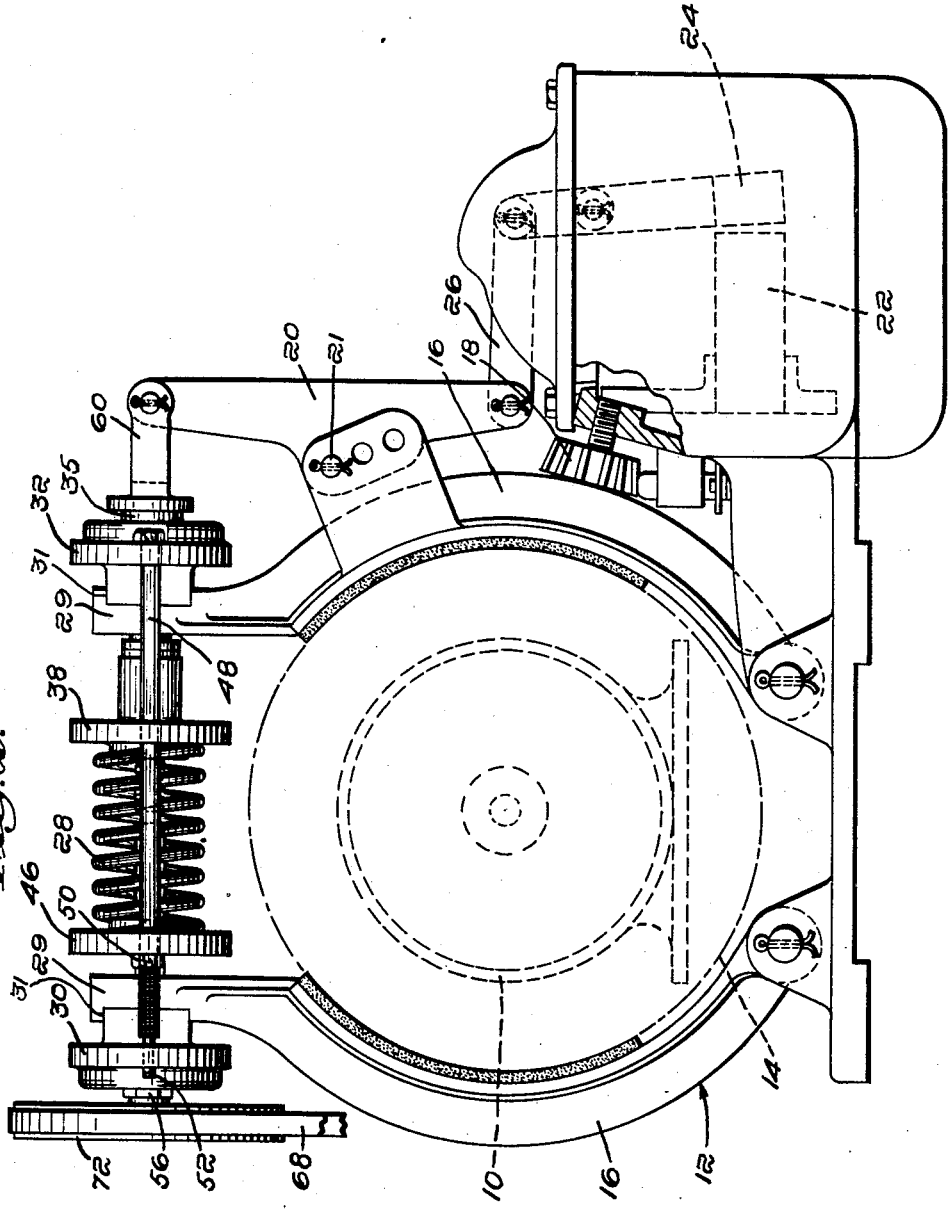
Inventor:
Arthur M. Tarbox,
by Thomson & Thomson
Attorneys Patented Apr. 6, 1948

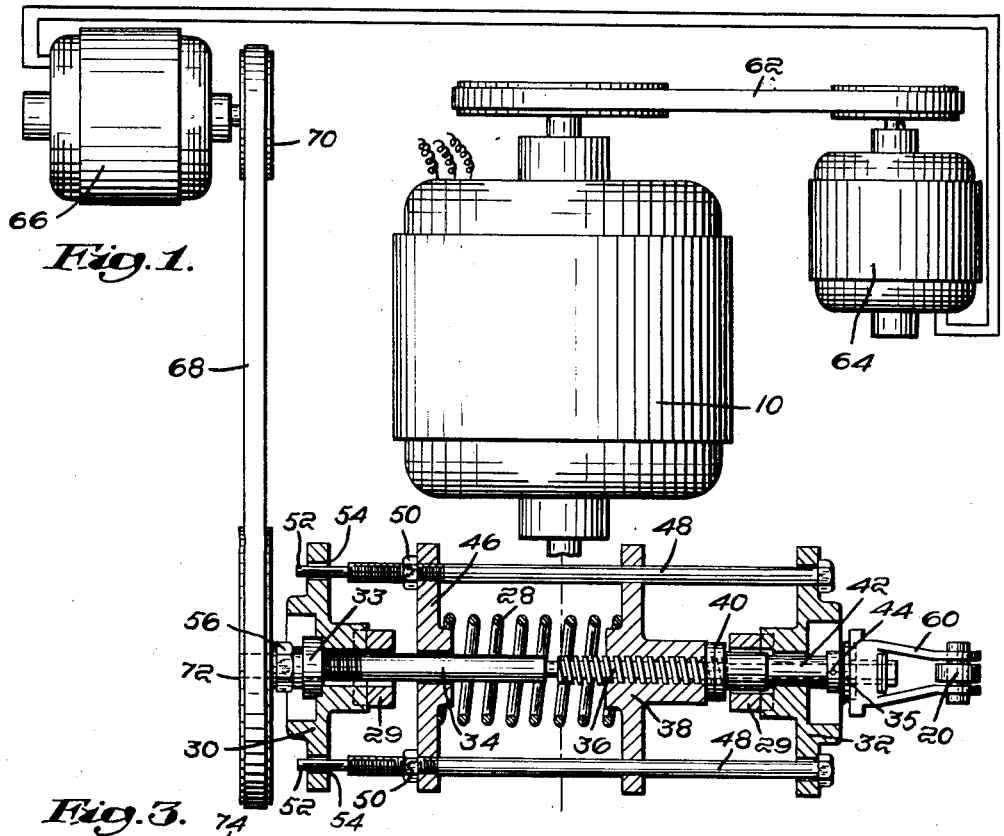

2,439,350

UNITED STATES PATENT OFFICE 2,439,350

AUTOMATIC ADJUSTMENT FOR ELEVATOR BRAKES

Arthur M. Tarbox, Belmont, Mass., assignor to F. S. Payne Co., Cambridge, Mass., a corporation of Massachusetts Application October 9, 1943, Serial No. 505,631

10 Claims. (Cl. 188—171)

This invention relates to improvements in a braking system for elevators, and more particularly to the provision of means for automatically adjusting the strength of elevator brakes.

My invention is especially applicable to automatic elevators having spring-pressed friction brakes which are released electromagnetically. In elevators of the automatic type, the brake is automatically applied as the elevator reaches a point a short distance from the floor at which it is to stop. The distance which the elevator travels from the point at which the brake is applied until it comes to a stop may be referred to as the "slide." It is, of course, desired that the elevator should stop level with the floor, but in practice, due to various factors such as the condition of the equipment, variations in load, etc., which cause variations in speed, it is found that the car may not always automatically stop at the desired point, and that this condition can not be completely corrected by the ordinary manual adjustments. Decreasing the slide may make the difference in level smaller, but this will require increasing the strength of the brake spring, and the faster stop is not as comfortable to the passengers and increases the wear of the brake linings.

It is an object of my invention to automatically control the force by which the brake is applied in accordance with the speed of the elevator, so that the "slide" of the elevator car from the instant of applying the brake until the car is brought to a stop will be substantially constant.

It is further an object of my invention to automatically set or adjust the brake for subsequent application while the brake is released, whereby the effective strength of the brake is increased as the car speed increases and decreased as the car speed falls off.

It is a still further object of my invention to provide in combination with a spring-pressed friction brake rotatable means acting upon the brake spring and electrical means for producing a force to turn the rotatable means and compress the brake spring in accordance with the speed of the elevator car.

Further objects and advantages of my improvements will be more readily apparent from the following description of a preferred embodiment thereof as illustrated in the attached drawings, in which Fig. 1 is a plan view of the elevator brake system, the top of the brake being shown in section horizontally thereof;

Fig. 2 is a side elevation of the friction brake with a part of the control casing being broken away and shown in section; and Fig. 3 is a diagrammatic view of the electrical connections.

It will be understood that I have disclosed my improvements in a braking system for elevators, but that the system could be readily designed to apply to an automatic brake for any motor driven load.

The driving motor for the elevator is shown at 10. In accordance with standard practice, the motor 10 drives a winding drum or traction sheave either directly or through gears (not shown). The friction brake 12 shown in Fig. 2 is applied to a brake drum or brake wheel 14 which may form part of the coupling through which the motor 10 drives the elevator. The brake 12 is in general a standard type of spring-applied and electromagnetically released brake, and comprises the brake shoes 16, adjustable shoe stop 18, brake lever 20 pivotally mounted on one of the shoes at 21, electromagnet 22, armature 24, and connecting link 26 between the armature 24 and lever 20. The brake shoes are normally urged into engagement with the brake drum by the spring 28 and are held in released position by energization of the electromagnet 22. A brake of this general type is shown in a patent to Smith No. 1,692,056, issued November 20, 1928.

The brake shoes 16 are formed with clevises 29 at their upper ends which are engaged by the collars 30 and 32. The collars 30 and 32 fit into recesses 31 formed in the clevises 29 which hold the collars against rotation. The rod or shaft 34 is supported at one end by an antifriction bearing 33 carried by collar 30, and at the other end by an antifriction thrust bearing 35 carried by the clevis 60. The shaft has a high pitch screw thread 36 engaged by the nut 38. The nut 38 is limited in its movement to the right in Fig. 1 by engaging a leather stop 40 on abutment collar 42 fixed to the shaft 34 by a pin 44. The nut 38 is free to move longitudinally but is restrained from rotation by the guide rods 48 mounted in collar 32 and a ring or collar 46. The rods 48 are provided with adjusting nuts 50 for fixing the position of the ring 46 with respect to the collar 32. The compression spring 28 acts between the nut 38 and the ring 46 normally holding the nut 38 against the stop 40 and the ring 46 against the adjusting nuts 50. The rods 48 have extensions 52 received in openings 54 formed in the collar 30. The shaft 34 is fixed in position with respect to the collar 30 by the adjusting nut 56 thrusting against the bearing 33. The clevis 60 connects the lever arm 20 to the shaft 34 through bearing 35 for release of the brake through energization of the electromagnet.

It will be understood that energization of the electromagnet 22 will rock the lever arm 20. The arm 20 initially fulcrums at its upper end and moves the right hand brake shoe 16 to which it is connected to released position into contact with the stop 18, and finally pushes the clevis 60 and shaft 34 to the left in Fig. 2, thereby compressing the spring 28. The left hand brake shoe will then be free to gravitally move to released position. When the electromagnet is deenergized, the expansion of spring 28 will force the brake shoes into frictional engagement with the brake drum 14.

As thus far described the brake will function normally. I have provided further means for variably increasing the compression of the spring 28 above its normal compression when the brake is released, and means for controlling such adjustment of the spring in accordance with the speed of the elevator. The driving motor 10 is connected through belt 52 to a direct current self-excited generator 64. The generator in turn is electrically connected to a rotating magnet 66, sometimes known as a torque motor. The rotating magnet or torque motor 66 is arranged to drive the shaft 34 through the belt 68 and pulleys 70, 72. The shaft 34 will be turned by the torque motor 66 in one direction only so as to cause the nut 38 to travel towards the left and compress the spring 28. The pitch of screw 36 is such that the nut 38 will overcome static friction and turn the shaft 34 backwards to release the spring pressure if the force of the spring overcomes the torque produced by motor 66.

The electrical connections are shown in Fig. 3, in which the A. C. supply lines are indicated at 74, 76. The circuit 78 connected to the A. C. supply lines includes a relay 80 and a switch 82. The switch 82 is controlled by the main elevator controller when the movement of the car is in the upward direction, there being a similar switch 82d for control purposes when the car movement is in the downward direction. Closure of the up switch 82 will energize the alternating current relay 80. The armature 84 of the generator 64 is connected by the closed circuit 86 to the rotating magnet 66. The circuit 86 may include a variable resistance 88 to control the maximum strength of the braking.

Rotation of the generator armature in the residual magnetic field will develop a small voltage in the circuit 86, and the voltage will rapidly build up as soon as the generator field is connected. Since the generator is driven from the elevator motor, it will reverse its direction of rotation according to the travel of the elevator, and separate circuits are provided for connecting the generator field in shunt across the armature in accordance with the direction of rotation thereof. The up circuit 90 connects the generator field 92 across the circuit 86. A variable resistance 94 forms a part of circuit 90. The A. C. relay 80 operates three switches 96, 98 and 100. The switches 96 and 98 must be closed to initially complete the circuit 90. It is to be understood that the switch 82 will be opened automatically by the elevator controller when power to the elevator motor is cut off as the car approaches the floor at which it is to stop, and means are provided to keep the generator field connected, even though the relay 80 is deenergized by opening of switch 82. I have therefore provided a circuit 102 connected across the circuit 86 in parallel with the generator armature and including the switch 100 and direct current relay 104. The circuit 104 will be closed by actuation of the switch 100, and the energization of the relay 104 will actuate the three switches 106, 108 and 110 which correspond to the switches 96, 98 and 100. The switch 106 completes a circuit 112 across the switch 96 to keep one line of the circuit 90 closed after switch 96 opens. The circuit 112 includes a variable resistance 114. Similarly, switch 108 completes a circuit 116 across the switch 98 and is effective in keeping the other line of circuit 90 closed after the switch 98 opens. Finally, the energization of the relay 104 is maintained after the switch 100 opens by switch 110, which completes the circuit 102 through the connection 118 and part of the circuit 116. The switches 106, 108 and 110 will be held in closed position by the relay 104 until the voltage in the circuit 86 has fallen to a relatively small amount due to slowing up of the elevator. Separate circuits 78d, 90d and 102d etc. are provided to control the car when it is travelling in a downward direction. These circuits control the relays 80d and 104d and the switches 96d etc. in the same manner as the up relays and switches.

While the elevator is at rest the brake will be set to hold the car at a position of rest. The minimum strength of the brake spring 28 is determined by the relative position of the bumper 40, collar 46, and is adjusted by nuts 50 on the rods 48. The adjustment of the spring for the minimum strength should be sufficient to hold the car against running away under the heaviest load that may be carried, and also sufficient in strength so that the brake will stop the travel of the elevator car even though there may be failure of the electrical circuits. It will be understood, however, that such minimum adjustment of the spring may not be sufficient to stop the car at the desired floor. The elevator may be of the type known as single automatic push-button, with a conventional single speed A. C. motor and controller. On the main elevator controller is an auxiliary, normally open, contact 82 on the up direction switch, and also a normally open contact 82d on the down direction switch. The car is started by energization of the electromagnet 22 to release the brake and by starting of the motor 10. Simultaneously with application of power to motor 10, switch 82 or switch 82d will close, depending on whether the elevator starts up or down. Let us assume that the car starts up, and switch 82 is closed. The alternating current will energize relay 80, closing switches 96, 98 and 100. At the same time the direct current generator 64 starts revolving and building up its voltage due to the rotation of its armature 84 in the residual magnetic field. When the voltage of the generator has built up to a sufficient value the direct current relay 104 will be energized, thereby closing the switches 106, 108 and 110. This occurs at approximately the time that the elevator car has accelerated and reached its normal rated speed.

The torque developed by the rotating magnet 66 will be governed by the speed at which the elevator is travelling, because the voltage developed by the generator is determined by the speed at which the elevator motor is rotated. The torque developed by the rotating magnet 66 will be transmitted through the belt 68 to the pulley on the shaft 34, and the adjusting screw 36 will be turned to move the travelling nut 38 in a direction to compress the spring 28 until the resistance of the spring balances the turning force. The spring will be compressed an amount which will be determined by the speed of the elevator motor and the characteristics of the generator, the characteristics of the rotating magnet, and the setting of the various control resistances.

When the floor stop opens the up direction contactor on the main control panel, the auxiliary normally open contact 82 will reopen, and control relay 80 will be deenergized to open switches 96, 98 and 100. The generator armature will still be connected to its field 92 through relay 104, holding the switches 106, 108 and 110 closed. The brake will be applied in the usual manner by deenergizing the electromagnet 22, but the strength of the brake will be determined by the amount the spring has been compressed while the car was running. During most of the retardation period, or slide, the relay 104 will remain closed and the generator will continue to furnish current to the rotating magnet. When the voltage of the generator has decreased to a fractional value of its normal voltage, and the speed of the car has dropped to a very low value, the relay 104 will open and the generator field will no longer be connected to the generator armature. Thereupon the spring 28 will force the travelling nut 38 along screw 36, turning shaft 34 backwards until nut 38 contacts the bumper 40. It will be understood that the shaft 34 may start to turn backwards before the relay 104 opens, if the force of the spring is sufficient to overcome the decreasing torque of the rotating magnet 66. This gradual reduction of brake strength during retardation of the car will tend to eliminate the jolt frequently experienced during the final stages of the stopping of single speed elevators. If the controls are properly set, the car will be stopped level with the floor and the car will continue to stop level with the floor under varying conditions of speed and load.

The load speed and energy speed characteristics of an elevator may differ in two directions of travel. The resistance 94 is adjusted to obtain the correct braking for upward motion of the car, and resistance 94$^d$ is adjusted to obtain the correct braking for downward motion of the car. The maximum strength of the braking is determined by the setting of the resistance 88 in series with the rotating magnet. To control the degree of back-off of the braking during retardation, resistance 114 is used for the up direction and resistance 114$^d$ for the down direction. Increasing resistances 114 and 114$^d$ will make the stops more gradual, and decreasing these resistances will make the stops more abrupt.

The relation between the variation in effective strength of the spring and the variation in speed of the elevator is based upon the particular portion of the generator magnetization curve that is being used determined by the setting of resistances 94 and 94$^d$. The used portion of the voltage speed curve of the generator may be approximately a straight line, or concave upwards or concave downwards. Thus the increase in the effective strength of the spring may be directly proportional to the variation in speed of the car or may be made to increase at a faster or slower rate as the car speed increases.

My system of adjusting the brake setting spring in accordance with variations in speed of the load has many advantages and could be used in connection with various types of elevators, both manual and automatic, or with other motor driven loads. The minimum amount of braking is used and the effective life of the brake linings is increased. In moderate speed elevator equipment a part of the braking is done by the frictional resistance of the motor, gearing, guide rails and machine bearings.

The amount of frictional braking required to stop and hold the car at a desired level is determined by the length of the slide. If the length of the slide is increased, the frictional braking does a smaller percentage of the total braking. The brake lining life is increased by taking advantage of the inherent braking in the elevator equipment. My improvements are particularly useful with automatic elevators. The equipment required is much less expensive than leveling mechanisms at present in use. I am able to use a single speed A. C. motor instead of a two speed A. C. motor or a variable voltage elevator set. The stops are made gradually without discomfort to the passengers.

Although I have described my improvements in connection with a spring-pressed friction brake of a common type, it will be understood that brakes of other types could be modified to obtain the same results within the spirit of my invention, and that although my improvements are particularly directed to motors and brakes therefor which drive elevators, my improvements could be applied to other motor driven loads where it is desired that the movement of the load and the motor which drives it should be stopped after a predetermined distance of travel of the load or number of rotations of the driving motor by applying the braking in a variable amount in accordance with the speed of the motor. It will be understood that since it is desired in elevator equipment to keep the slide constant, necessarily the number of rotations of the driving motor from the time that the power is cut off and the brake is applied until the motor stops will also remain constant.

I claim:

1. In an elevator brake, a pair of brake shoes, a pair of collars engaging said brake shoes, a shaft carried by said collars, a bearing on said shaft engaging one of said collars, a ring slidably mounted on said shaft intermediate said brake shoes, adjustable rods connecting said ring to the other of said collars, a screw thread on said shaft, a nut threaded on said shaft and held against rotation by said rods, a compression spring acting between said nut and said ring, said spring being effective to apply said brake shoes, and automatic means responsive to variations in speed of the elevator for turning the shaft while the brake is released to cause said nut to move longitudinally and compress said spring.

2. In combination with a motor, a single brake for stopping said motor, means to apply said brake with a normal strength independent of the motor speed, automatic means for producing a variable force responsive to the motor speed, reversible means intermediate said brake applying means and said force producing means, said reversible means being movable in one direction by said force producing means to act upon the brake applying means and increase the effective braking strength thereof while the brake is released and during the period of brake application, and movable in the opposite direction by the force of said brake applying means overcoming the force of said force producing means, and stop means for limiting the movement of said reversible means by said brake applying means.

3. In combination with a motor, a brake for said motor, means to apply said brake with a normal strength independent of the motor speed, means for producing a variable force responsive to the motor speed, reversible screw-threaded members intermediate said brake applying means and said force producing means, one of said screw-threaded members being movable in one direction by said force producing means to cause the other screw-threaded member to act upon the brake applying means and increase the effective braking strength thereof, said last named screw-threaded member being movable in the opposite direction by said brake applying means to return said first named screw-threaded member to its normal position, and stop means for limiting the movement of said screw-threaded members by said brake applying means.

4. In combination with a motor, a brake for said motor, and means to apply said brake with a normal strength independent of the motor speed, a rotatable shaft, a nut threaded on said shaft, means to hold said nut against rotation while permitting lateral movement thereof, means to turn said shaft in a direction to cause said nut to act upon said brake applying means and to increase the effective strength thereof, means to control said shaft turning means in accordance with the speed of the motor, said shaft being movable in a reverse direction by said nut as the strength of the brake applying means overcomes the power applied to turn said shaft.

5. In combination with a motor, an automatic brake for said motor, means effective to apply said brake with a normal strength, a movable thrust member acting upon said brake applying means, stop means for fixing the normal position of said thrust member, means for producing a force tending to move said thrust member away from said stop means and increase the effective strength of said brake applying means and means for controlling said force producing means in accordance with the speed of said motor, whereby the effective braking strength is automatically adjusted while the brake is released and during the period of brake application by variations in the motor speed.

6. In combination with a motor, an automatic brake for said motor, means for applying the brake with a normal effective strength, means for producing a variable force acting upon said brake applying means to increase the effective braking strength and means for controlling said force producing means in accordance with variations in speed of said motor whereby the effective braking strength is increased by an increase in motor speed and is decreased by a decrease in the motor speed, said control means providing for an automatic adjustment of the effective braking strength while the brake is released and during the period of brake application.

7. In an elevator braking system, an elevator motor, a brake therefor, mechanical means for applying the brake, a generator coupled to the motor, a torque motor energized by the voltage developed by said generator and means controlled by the degree of rotation of said torque motor from its normal inactive position and acting through the mechanical means to increase the braking force.

8. In a brake for an elevator, a spring to apply the brake, electro-magnetic means to release the brake, a laterally movable screw threaded member, said spring being positioned between said member and the brake, a rotatable member in threaded engagement with said laterally movable member, whereby said rotatable member may cause lateral movement of the other member to increase the effective braking force of the spring and the spring reaction may cause reverse rotation of said rotatable member and means variably controlled by the speed of the elevator continually tending to turn said rotatable member and adjust the effective strength of the spring while the elevator is in motion before and during the period of brake application.

9. In combination with a motor, a brake to slow down and stop said motor after the motor power has been cut off, means for applying said brake to said motor, means for releasing said brake when power is applied to said motor, a pair of reversible screw-thread members, variable force producing means tending to turn one of said members in one direction only to produce lateral movement of the other member in a direction to act upon and variably increase the force of the brake applying means while the brake is released and during the period of brake application, said variable force producing means becoming inactive upon stopping of the motor and said screw-threaded members being automatically returned to normal positions by the reaction of the brake applying means.

10. In an elevator braking system, an elevator motor, a brake therefor, spring means for setting the brake, a generator coupled to the motor, a torque motor electrically connected to the generator, means for increasing the effective force of the spring means to apply the brake with greater force, means operable by the rotation of the torque motor from its inactive position for continuously adjusting the means for increasing the effective force of the spring means while the brake is released and during the period of brake application, whereby the effective braking force is directly responsive to the speed of the motor and the elevator will be stopped in a substantially uniform distance of travel after the brake is applied.

ARTHUR M. TARBOX.

REFERENCES CITED

The following references are of record in the file of this patent:

UNITED STATES PATENTS

| Number | Name | Date |
|---|---|---|
| 330,242 | Magnuson | Sept. 4, 1906 |
| 891,632 | Neenan | June 23, 1908 |
| 891,947 | McCollum | June 30, 1908 |
| 1,304,870 | Gale, Jr. | May 27, 1919 |
| 1,660,620 | Lautrup | Feb. 28, 1928 |
| 1,871,164 | Dunlop | Aug. 9, 1932 |
| 1,924,320 | James | Aug. 29, 1933 |
| 2,123,747 | Schiebeler | July 12, 1938 |
| 2,183,409 | Schiebeler | Dec. 12, 1939 |
| 2,218,605 | Down | Oct. 22, 1940 |
| 2,257,301 | Larson | Sept. 30, 1941 |

FOREIGN PATENTS

| Number | Country | Date |
|---|---|---|
| 88,904 | Austria | July 10, 1922 |